April 17, 1928.  
J. FISHER  
CANE HARVESTER  
Filed Sept. 30, 1926
1,666,818
6 Sheets-Sheet 5
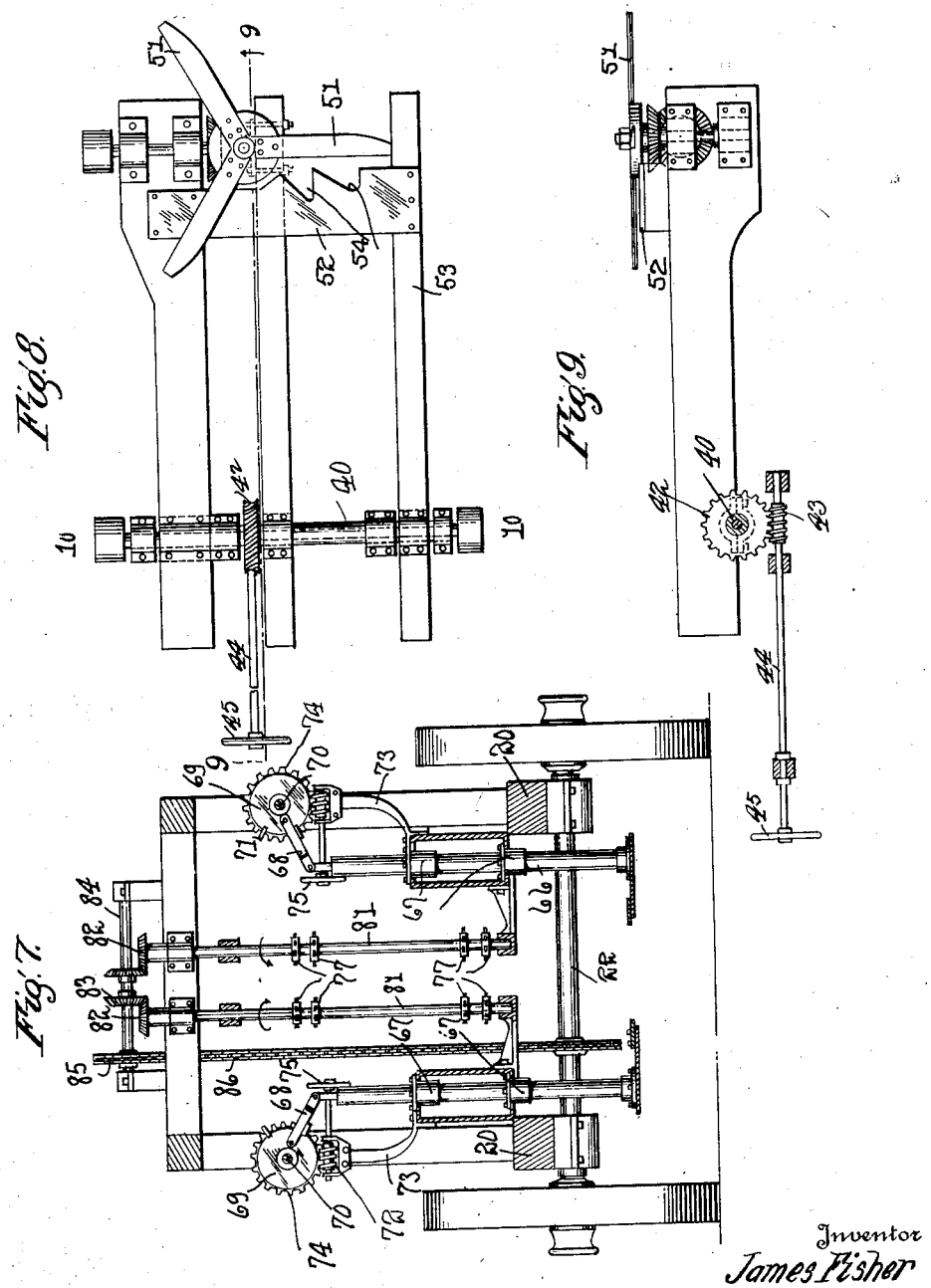
Inventor  
James Fisher
By Wilkinson & Giusta  
Attorneys.

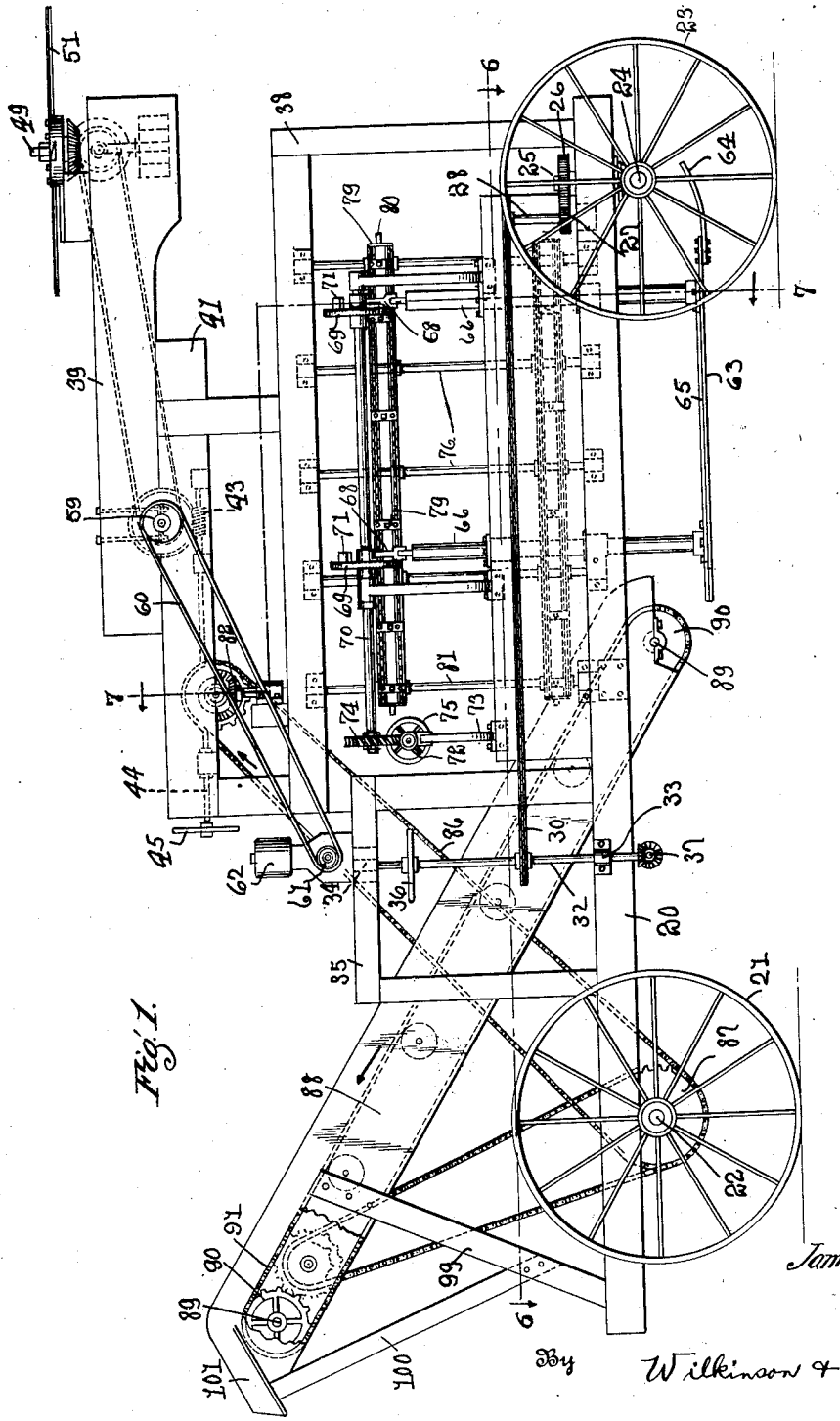

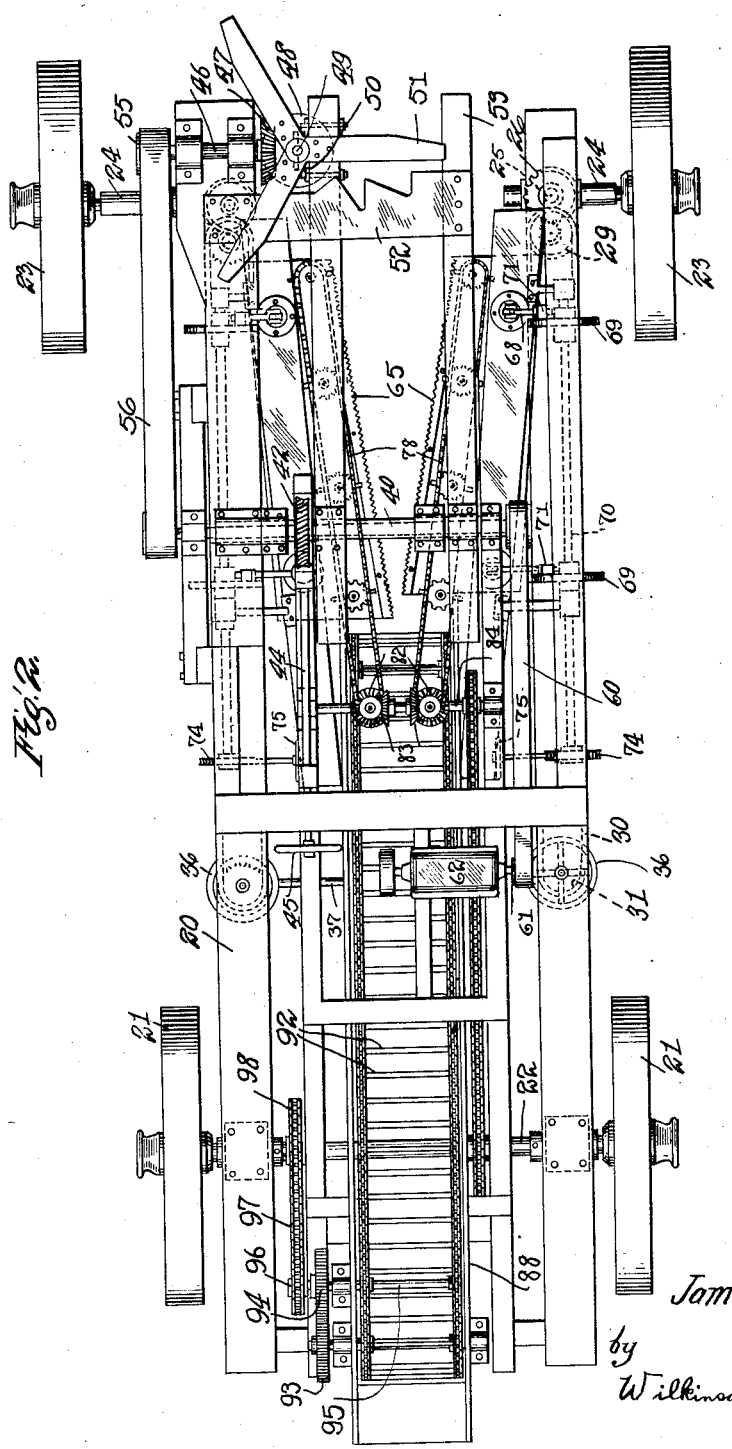

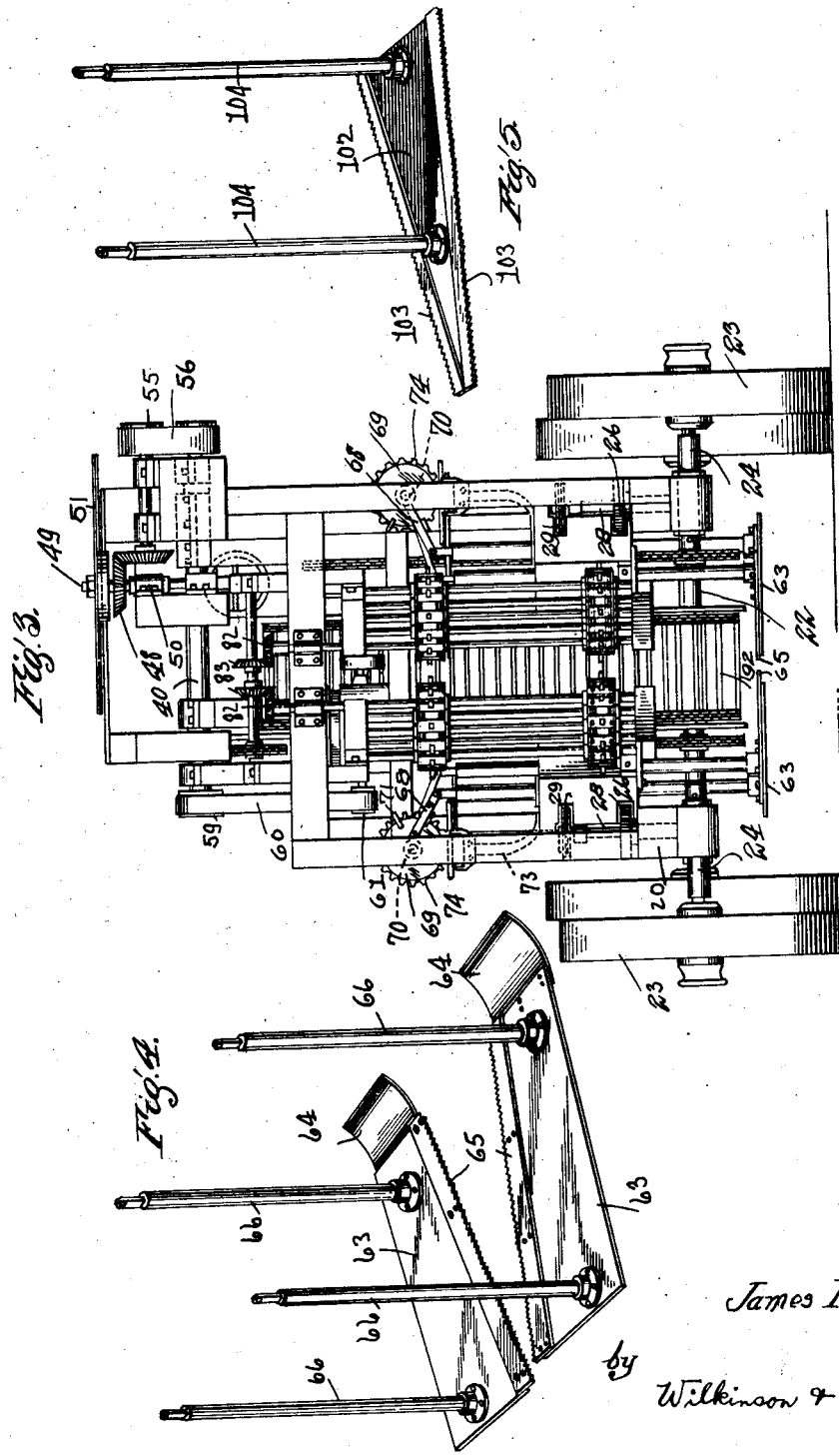

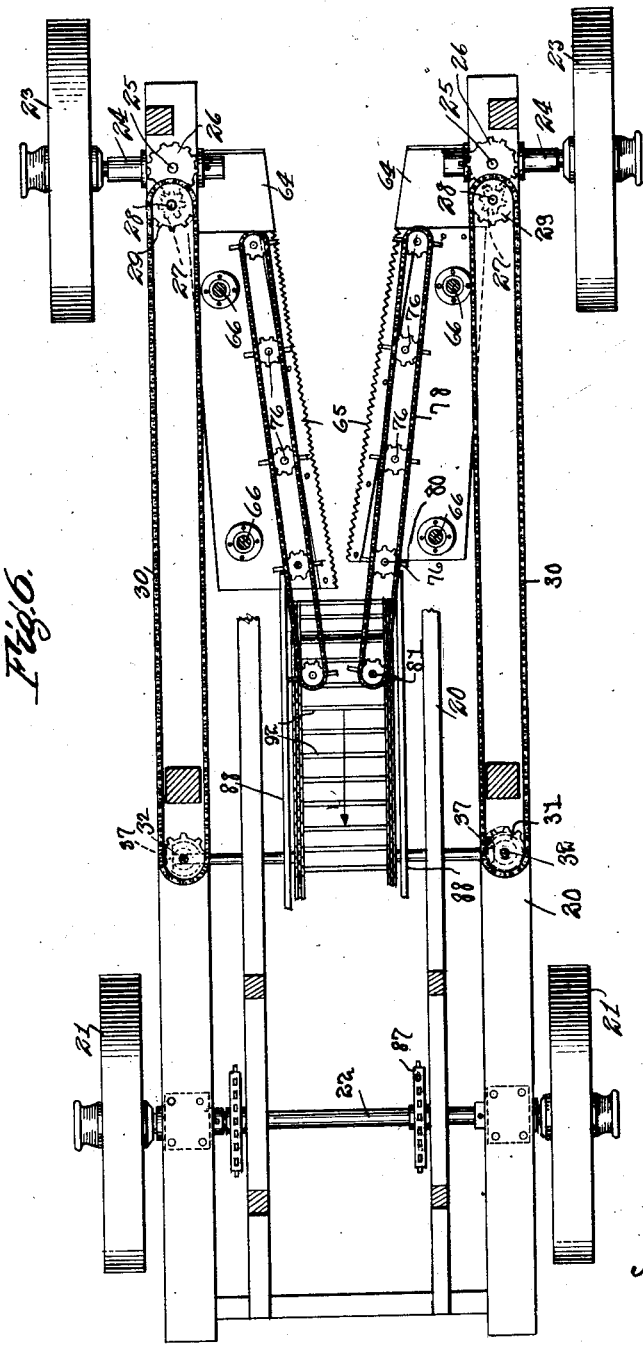

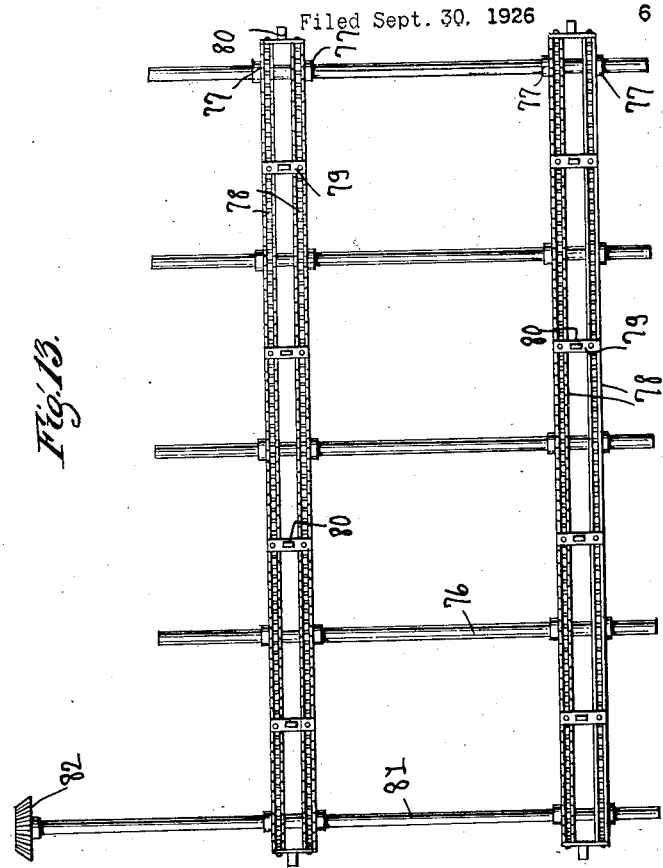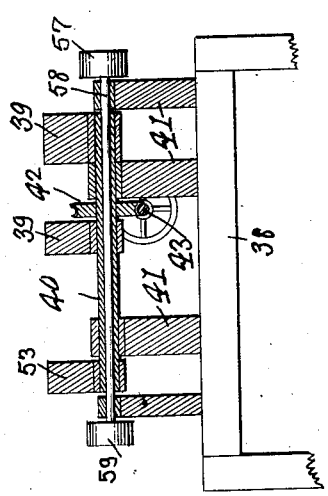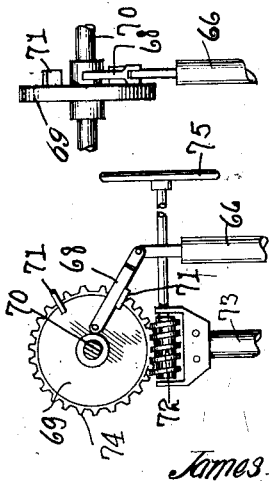

Patented Apr. 17, 1928.

1,666,818

UNITED STATES PATENT OFFICE.

JAMES FISHER, OF NEW ORLEANS, LOUISIANA.

CANE HARVESTER.

Application filed September 30, 1926. Serial No. 138,735.

The present invention relates to harvesting machines, and has for an object to provide a machine of this character which is of peculiar construction adapting it particularly for the harvesting of cane.

An object of the invention is to provide a cane harvester with a topping device which is adjustable so that the cane may be topped according to its height, and wherein the adjustment may be easily effected by manipulation of a hand wheel or the like, the harvester also embracing a novel stalk cutting device which is adjustable and at the same time yieldable for passage over uneven ground without injury to the mechanism and without digging into the ground to the injury of the cutters, and also to maintain an even cutting of the stalks near the ground.

The invention also provides a novel carrying means for the stalks and conveying means to receive the stalks from the carrying means so that the stalks may be carried through the machine without jamming or interruption, and whereby the stalks may be delivered from the rear end of the machine to wagons, receptacles or the like which may be provided for collecting the stalks as desired.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a cane harvester constructed according to the present invention.

Figure 2 is a top plan view of the same.

Figure 3 is a front elevation of the cane harvester.

Figure 4 is a detail enlarged perspective view of a pair of cutters used for cutting stalks at the forward end of the harvester.

Figure 5 is a detail perspective view of a modified form of cutter which may be substituted for the structure shown in Figure 4.

Figure 6 is a horizontal longitudinal section taken through the harvester substantially on the line 6—6 of Figure 1.

Figure 7 is a vertical transverse section taken through the harvester on the line 7—7 of Figure 1, showing the adjustable means for the cutters and the drive for the carrier.

Figure 8 is a detail top plan view of the cane topper.

Figure 9 is a side elevation of the same, partly in section.

Figure 10 is a transverse section through the adjusting means for the topper taken substantially on the line 10—10 of Figure 8.

Figure 11 is a detail fragmentary view, partly in section, of the stalk cutter adjusting means.

Figure 12 is an edge view of the same, and

Figure 13 is a detail side elevation of one side of the carrier.

Referring to the drawings, 20 designates a frame provided with rear wheels 21 fixed upon a transverse shaft 22 adapted for driving certain of the mechanisms hereinafter described.

The frame 20 is open at its forward end and is provided thereat, and at each side with a steering wheel 23. Each wheel 23 is mounted on a spindle 24 connected to a vertical stub shaft 25 provided with a gear wheel 26, which meshes with a pinion 27 carried upon a shaft 28 which rises from the side of the frame 20. The shaft 28 carries a sprocket wheel 29 over which passes a chain 30, which extends rearwardly to a sprocket wheel 31 mounted on a steering shaft 32 mounted at its lower end in a bearing 33 at the side of the frame 20 and at its upper end in a bearing 34, which is mounted upon a bracket or super-structure 35 forming part of the frame 20. The steering shaft 32 is provided with a hand wheel 36 by means of which the shaft 32 may be turned. There is a shaft 32 mounted at each side of the frame 20, and the shafts may be connected together by a transverse shaft and bevel gear 37, as shown in Figures 1, 2 and 6 for the purpose of connecting both of the front wheels 23 together and controlling the path of travel of the harvester from either side.

The frame 20 is provided at its forward end with a second bracket or super-structure 38 of suitable construction to accommodate the parts and which supports the cane topper. The cane topper comprises a number of arms 39, which as shown particularly in Figure 10, are spaced apart and are rigidly secured to a sleeve or hollow member 40, which has bearing in beams 41 carried by the super-structure 38, and which are spaced apart in offset relation with respect to the arms 39, so that the latter may be swung vertically between the beams 41 to raise and lower the forward ends of the arms 39. The sleeve 40 has fixed to it a worm gear 42 which meshes with a worm 43 carried by a shaft 44 extending rearwardly to a suitable point intermediate the length of the machine and which is there provided with a hand wheel 45 by means of which the worm 43 may be turned to swing the arms 39 up and down. The arms 39 extend forwardly to a point adjacent to or slightly in advance of the forward end of the frame 20 carrying a transverse shaft 46 having a beveled gear 47 on its inner end which meshes with a correspondingly beveled gear 48 mounted on a cutter shaft 49. The shaft 49 is mounted in a suitable bracket 50 and extends upwardly from the arms 39 and carries a rotary cutter 51 in the form of a plurality of radially extending blades. The blades of the cutter 51 are of sufficient length to project across the throat of the machine at its forward end, as shown in Figure 2 and the arms 39 and their associated parts are disposed at one side of the frame, so that the blades of the cutter are brought one at a time into position across the throat to top the cane stalks. For the purpose of insuring an even cutting of the tops of the stalks and prevent jamming of the same, a guide plate 52 is secured across the arms 39 adjacent to the cutter 51 and extends entirely across the throat of the machine and is supported upon a beam 53 disposed at the opposite side of the machine and supported upon the sleeve 40. The guide plate 52 is disposed closely beneath the cutter 51 and has a number of recesses 54 in its forward edge opposite the throat of the machine, which form pockets into which the upper ends of the cane stalks may be received and held during the action of the cutter 51.

The guide plate 52 and the cutter 51 are in fixed definite relation with respect to each other and are swung up and down at the top of the throat in the machine to accommodate stalks of different heights. The cutter 51 is rotated by a pulley 55 mounted on the outer end of the shaft 46 and which carries a belt 56 extending rearwardly to a point opposite the sleeve 40 and passes over a pulley 57 mounted on a shaft 58, which is journaled through the sleeve 40 and has at its other end a second pulley 59, which carries a second belt 60 passing backwardly to the pulley 61 of an engine 62 of any adaptable type, such as an internal combustion engine, as shown in Figure 1. The cutter 51 is therefore driven independently of the other mechanism of the machine, or it may be operated in any other manner found convenient and adaptable.

The forward end of the machine is also provided with stalk cutters adapted to operate near the ground. As shown in Figure 4 particularly, the stalk cutters comprise a pair of plates 63 disposed horizontally and having outwardly flaring inner edges to provide a flaring throat between the cutters. The plates 63 are provided with upwardly curved shoes 64 at their forward ends adapted to engage the ground at times and elevate the plates 63 when the ground is uneven to prevent the contact of the forward edges of the plates with the ground, stones or other projections. Cutting blades 65 are bolted or otherwise suitably secured to the inner edge portions of the plates 63 and have toothed cutting edges which flare forwardly in the throat of the machine for contact with the cane stalks as the machine moves forwardly to thereby sever the stalks, the stalks passing rearwardly over the upper surfaces of the plates 63. Each plate 63 is provided with a pair of posts 66, one near each end of the plate 63 and the same being spaced outwardly from the cutting blades 65 to permit the free passage of the stalks over the plates when the stalks are cut. The posts 66 extend upwardly through bearings 67 mounted on the opposite sides of the frame 20 and are pivoted to arms 68 in the form of links which have pivotal connection to the faces of discs 69 fixed upon shafts 70. There is a disc 69 for each post 66 and a shaft 70 journaled longitudinally in each side of the frame, the links or arms 68 extending inwardly from the sides of the frame and being freely movable upon their respective discs 69 between stop lugs 71 which are mounted on the face of the adjacent disc 69 and at the inner side of the frame.

A worm 72 is mounted transversely in a bracket 73 at each side of the machine and meshes with a toothed wheel 74 upon the rear end of each shaft 70, a hand wheel 75 being connected to each worm 72 for operating it to turn the shafts 70, rotate the disc 69 and move the stop lugs 72 into the desired position for supporting the cutting blades 65 at the desired height above the ground. By spacing the lugs 71 on the discs 69 the cutting blades and the posts 66 may be elevated by the obstructions encountered along the ground when the shoes 64 contact therewith without imposing any strain upon the mechanism or in any manner injuring the machine.

The frame 20 is also provided at its intermediate portion and at opposite sides of the throat with a pair of carriers adapted to engage the stalks after they have been topped and to carry the stalks rearwardly as they are being cut by the blades 65. Each carrier, as best shown in Figure 13, comprises a plurality of vertical shafts 76 journaled in the frame 20 and provided near its upper and lower ends with pairs of sprocket wheels 77 over which pass upper and lower pairs of chains 78, the latter being connected together at suitable intervals by cross bars 79. Each cross bar 79 carries a lug 20 which projects outwardly from the cross bar 79 to an extent sufficient to engage the stalks and force them backwardly as the chains 78 travel. The carrier may be driven in any suitable manner but is shown in the present instance as having its rearmost shaft 81 elongated at its upper end and provided with a beveled pinion 82, which meshes with a beveled gear wheel 83 mounted on a transverse shaft 84 journaled in the super-structure of the frame as best shown in Figure 7. The shaft 84 carries a sprocket wheel 85 over which passes a chain 86, and the chain 85 extends downwardly to a sprocket wheel 87 mounted on the rear shaft 22, so that the carriers are driven by the rear wheels 21 of the machine.

A conveyor 88 is mounted upon the rear end of the frame 20 and comprises a suitable frame of elongated construction disposed lengthwise in the frame 20 with its forward end inclining downwardly beneath the rear converging ends of the carriers, as shown to advantage in Figures 1 and 2. The frame of the conveyor 88 has transverse shafts 89 at opposite ends and the shafts 89 carry pairs of spaced apart sprocket wheels 90 over which pass chains 91. The chains 91 are provided with transverse bars 92 forming the body of the conveyor belt and upon which the cane stalks are delivered from the carriers at the forward end of the conveyor. The upper shaft 89 is extended at one end and provided with a gear wheel 93 at the outer side of the frame 88, the gear wheel 93 meshing with a second gear wheel 94 mounted on a transverse shaft 95 journaled in the conveyor frame 88. The shaft 95 extends beyond the gear wheel 94 and carries a sprocket wheel 96 over which passes a drive chain 97 which extends downwardly and over a large sprocket wheel 98 mounted on the drive axle 22, so that the conveyor is driven by the rear wheels 21 of the cane harvester.

The rear end of the conveyor frame 88 is mounted upon bracket arms 91, which extend upwardly from the lower part of the frame 20 and the arms 99 carry rearwardly and upwardly extending braces 100, which engage and support an apron 101, which extends at an angle rearwardly and downwardly from the conveyor belt.

The stalks delivered upon the conveyor belt, generally designated at 92, are carried upwardly and deposited upon the apron 101, so that the cane stalks may slide by gravity downwardly into any suitable device or receptacle into which the cane stalks may be accumulated. It is of course understood that various other devices may be used such as are well known in the art for carrying the stalks further rearwardly from the apron 101, or laterally for depositing the stalks in a wagon which may be drawn along side of the harvester while in motion.

In Figure 5, is shown a modified form of stalk cutter wherein a substantially triangular shaped plate 102 is provided having opposite converging lateral edges to which are secured a pair of cutter blades 103 provided with cutting teeth of any desired size for contact with the stalks. The plate 102 has a pair of spaced apart upstanding posts 104 which may be of the same structure as the posts 66, shown in Figure 4, and adapted to support the cutter plate 102. These posts 104 may be easily substituted for the posts 66, so as to substitute the plates 102 for the plates 63.

In operation, the cane harvester may be driven forwardly by any suitable power, such as by mules, a tractor or may even be provided with a suitable motor for self propulsion. The cutting plates 63 are adjusted by turning the handles 75 at opposite sides of the machine to rotate the shafts 70 and turn the discs 69 to adjust the spaced apart stops 71 in such position as to limit the downward sliding movement of the posts 66 beyond a predetermined extent. This adjustment thus maintains the blades 63 in their lowest positions, at the desired space above the ground under normal conditions. The shoes 64 on the forward ends of the plates 63 are adapted to glide over obstructions, earth mounds and the like tending to strike against the plates 63. The shoes 64, being curved, elevate the plates and such action is permitted by the upward sliding of the posts 66 in the bearings 67 and the loose play which the links 68 have between the stops 71.

As the machine approaches the stalks, the upper ends of the latter are caught in the serrations or pockets 54 of the guide plate 52 and as the cutter 51 is continuously rotated, the tops of the stalks are quickly severed. By providing the separate and independent pockets 54, the stalks are more or less distributed lengthwise of the blades of the cutter or topper 51, so that there will be no jamming of the cutter and an even cutting operation would be effected. As the machine travels further forwardly the topped stalks enter the throat of the machine and are brought against the saw teeth or serrated edges of the cutting blades 65. At the same time, the carriers in the opposite sides of the throat of the machine, engage the stalks and urge the same backwardly into the contracted inner end of the throat to insure a uniform and even cutting action and to maintain the stalks upright. It will be noted particularly from Figures 2 and 6 that one of the plates 63 with its cutting blade 65 is slightly longer than the other and the rear end of the longer plate is offset rearwardly from the opposite plate. Such construction and arrangement insures the complete cutting of all of the stalks which are in the throat particularly of such stalks as remain in the center of the throat and which otherwise might pass either wholly uncut, or partially cut between the spaced rear ends of the blades 65. By elongating one of the blades 65, and maintaining its transversely inclined position, it constitutes an overlap at the rear end of the throat to insure engagement of all of the stalks with either one or both of the cutting blades 65.

The severed stalks are moved backwardly by the carriers and deposited upon the conveyor 88. The conveyor 88 is continuously operated to elevate the stalks to the apron 101, and the stalks may be disposed of from this point as is found convenient and desirable.

The machine is guided in its movement by manipulation of the hand wheel 36 which controls the steering shaft 32 and the front ground engaging wheels 23. The topper is adjusted vertically by swinging the arms 39 up and down at their forward ends by manipulation of the hand wheel 45, so that the top cutter 51 may be operated at different heights to accommodate the heights of the stalks.

The machine is thus designated to accomplish by use of a relatively simple and substantial construction the work usually requiring a large number of field hands and incident to the adjustability of its top and stalk cutting devices may be quickly and easily adapted to the conditions of the ground and the heights of the cane stalks to be cut. The loose support of the stalk cutting plates 63 admits of the travel of the device over uneven ground without requiring continuous adjustment of the parts and which insures the cutting of the stalks close to the ground even though in an uneven condition.

While I have shown in Figures 4 and 5 the stalk cutters 63, 65 and 102, 103 in the form of plates carrying toothed cutter bars, the stalk cutter may be of any suitable form with or without teeth and may have only a sharp knife edge if desired. Also the various driving connections may be by chains and sprockets as shown or may be effected in any other practical manner, such as by pulleys and belts, shafting or the like, and the stalk feeding chains and sprockets 78 and 77 may be substituted by broad pulleys and belts for carrying the flights or lugs 79.

It is obvious that various changes and modifications may be made in the details of construction and design of the above specifically described embodiment of this invention without departing from the spirit thereof, such changes and modifications being restricted only by the scope of the following claims:—

What is claimed is:—

1. A cane harvester comprising a frame having a throat in its forward end, a topper adjustably mounted upon the frame above the throat and adapted to be raised and lowered to accommodate stalks of varying height, a longitudinal shaft mounted in each side of the frame near the top of the throat, discs carried by the shafts, means for adjusting the shafts to turn the discs, links pivotally mounted on the discs, said discs having spaced apart stops between which said links are adapted to swing, and stalk cutters suspended from the links at opposite sides of the throat and normally maintained against the lower stops of the discs, the upper stops of the discs adapted to limit the upward movement of the stalk cutters when elevated by the ground.

2. A cane harvester comprising a frame having a throat at its forward end, a cane topper, means for adjustably supporting the cane topper above the throat on the frame, a pair of endless carriers mounted in the throat at opposite sides thereof, and a pair of cutting blades carried by the frame at opposite sides of the throat and converging rearwardly to engage the stalks and cut the same, one of said cutting blades extending beyond the other at the inner converging end of the throat to substantially overlap the same and insure the cutting of stalks passing through the throat.

3. A cane harvester comprising a frame having a throat in its forward end, a cane topper adjustably mounted on the frame above the throat, a pair of carriers mounted on the frame at the opposite sides of the throat and converging rearwardly thereof, a pair of cutters suspended in the frame at opposite sides of the throat below said carriers with one cutter extending rearwardly beyond the other and substantially overlapping the rear end of the throat, and a conveyor extending from the rear end of said cutters and carriers for removing the cut stalks.

4. A cane harvester comprising an elongated frame having a super-structure and a plurality of arms on the super-structure, a hollow sleeve fixed to said arms, a worm gear carried by the sleeve, a worm mounted on the super-structure meshing with the worm gear, a hand wheel connected to the worm for turning the same and rotating the sleeve to adjust the outer ends of the arms, a rotary topper carried on the outer ends of the arms, a pulley connected to the topper, a shaft journaled in said sleeve, pulleys on the opposite ends of said shaft, a belt connecting the pulley of the topper to one of the pulleys of said shaft, driving means for the topper having a pulley, a second belt between the other pulley of said shaft and the pulley of said driving means.

5. A cane harvester comprising a frame having a super-structure, a topper support pivotally mounted at one end of the super-structure, a topper mounted on the outer end of the support adapted to be raised and lowered by the swinging of the support, manual means for swinging the support, and drive means connected to the topper through the pivotal connection of the topper support to driven the topper in different positions of adjustment.

6. A cane harvester comprising an elongated frame having a throat in its forward end, a pair of carriers arranged in the frame at opposite sides of the throat and converging rearwardly thereof, a pair of cutters carried by the frame at opposite sides of and beneath the throat and converging rearwardly thereof, and adjusting means for the cutters, said adjusting means comprising a horizontal shaft disposed lengthwise in each side of the frame, spaced discs on the shaft having spaced lugs on one face thereof, a worm gear mechanism for adjusting and holding the shafts, a link pivoted to each disc for movement between the lugs thereof, and posts slidably mounted in the frame having pivotal connection at their upper ends to said links and connected to said cutters at their lower ends for supporting the cutters.

7. A cane harvester comprising an elongated frame having a super-structure and a throat in its forward end, a cane topper adjustably mounted on the super-structure above the throat, a pair of carriers mounted in the opposite sides of the throat and converging rearwardly thereof and having outwardly projecting lugs adapted to engage stalks entering the throat, a pair of cutters carried by the frame at opposite sides of the throat and converging beneath the carriers, posts vertically slidable in the super-frame and connected at their lower ends to said cutters, freely pivoted links in the superstructure near the upper ends of said posts, and stops in the superstructure in the paths of said links to limit the downward movement thereof and suspend the cutters from a point high above the ground.

JAMES FISHER.